Jan. 1, 1963 G. J. FAIRBANKS 3,071,187
HEAT EXCHANGER
Filed Nov. 3, 1958 2 Sheets-Sheet 1
FIG. 2.
FIG. 3.
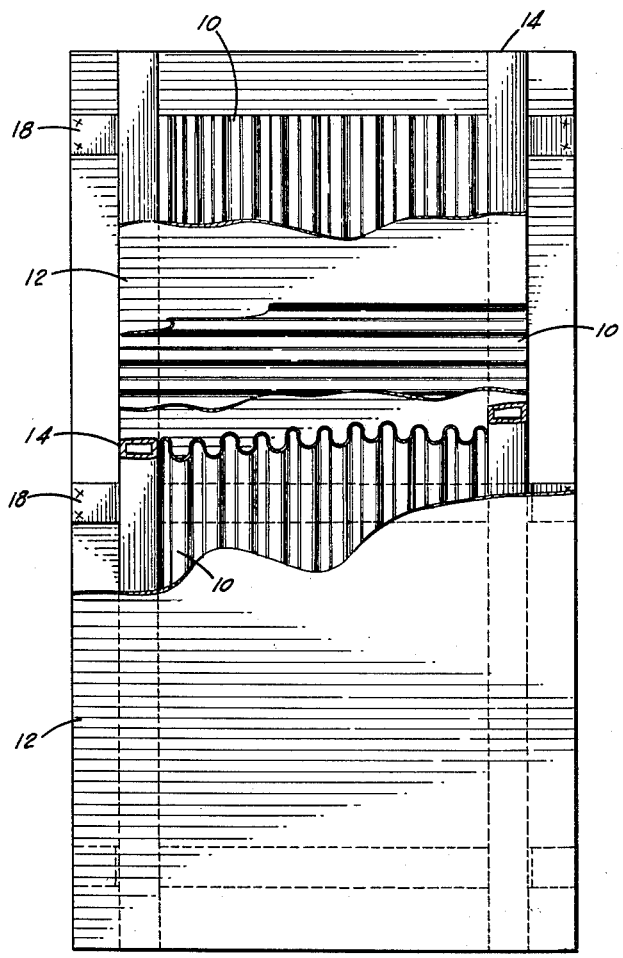
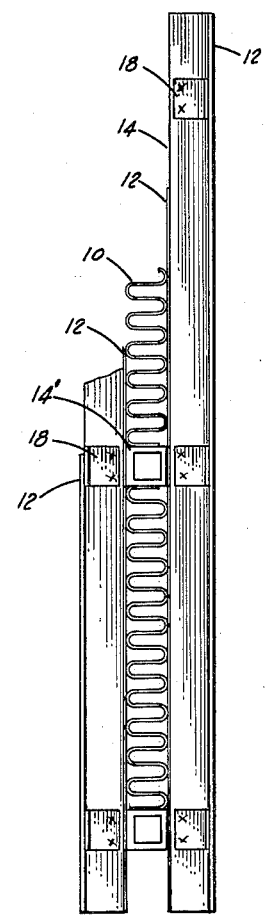
FIG. 1.
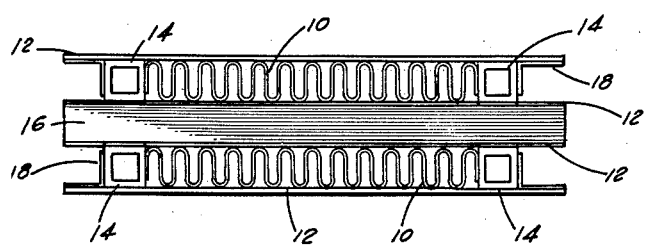
INVENTOR
GORDON J. FAIRBANKS.
By
ATTORNEY Jan. 1, 1963

G. J. FAIRBANKS 3,071,187

HEAT EXCHANGER

Filed Nov. 3, 1958

INVENTOR
GORDON J. FAIRBANKS

ATTORNEY

United States Patent Office 3,071,187
Patented Jan. 1, 1963

3,071,187
HEAT EXCHANGER
Gordon J. Fairbanks, Indianapolis, Ind., assignor to Stewart-Warner Corporation, Chicago, Ill., a corporation of Virginia
Filed Nov. 3, 1958, Ser. No. 771,299
8 Claims. (Cl. 165—170)

This invention relates to a plate and ruffled fin heat exchanger. More particularly, the invention concerns an arrangement for holding the heat exchanger parts in alignment with one another during the brazing process, while still allowing enough freedom for the assembly to differentially expand during brazing and to settle after brazing.

It is common practice in the manufacture of plate and ruffled fin heat exchangers to first assemble the parts making up the unit and then hold the assembled unit with the individual parts in alignment while brazing the complete unit in a single step. Various methods have been employed for brazing the unit such as dip-brazing, furnace brazing or the like. The brazing alloy may be in the form of a foil placed between the plates and the fins if the alloy being used can be obtained in this form, or if the alloy is in a powdered form, it is conventional practice to coat the sheets or plates by using an adhesive and the brazing powder. In some cases if the alloy can be plated, such as in the case with copper, it is plated on the sheets prior to assembling the heat exchanger unit. Since this brazing alloy, in any case, occupies a certain space between the ruffled fins and the separator sheets or plates, it is obvious that when the alloy melts, the assembly will settle. Usually, this settling of the parts is not uniform and the result is a heat exchanger assembly in which some of the parts are distorted and in which leakage may occur. Prior attempts to insure against misalignment of parts due to the settling have been quite expensive and difficult and usually have not been completely satisfactory.

In addition, when employing a single brazing step for a plate and ruffled fin heat exchanger, an additional problem exists. Usually, the materials making up the heat exchanger have different coefficients of expansion, and in any case the brazing alloy will invariably have a different coefficient of expansion than that of the core material. Likewise, if extremely thin material is used as in some parts such as separator plates or sheets, while spacer bars or support means may be of somewhat thicker material, there is a difference in growth or contraction between the various parts. At the same time, during the brazing process, a new alloy is formed in certain instances between the brazing alloy and a portion of the dissolved parent metal. This new alloy contains a portion of the parent metal and a portion of the brazing alloy which will have a different coefficient of expansion from that of either the parent metal or the brazing alloy. With this in mind, it is obvious that as the assembly goes down through the solidus and cools off to room temperature, the various parts will tend to contract at differing rates. If the part happens to be originally of fairly heavy cross section such as a spacer bar or the like, it will tend to contract at the rate of the parent metal but if the part is relatively thin, such as a separator sheet, then it will tend to contract at the rate of the brazing alloy or the new alloy that is formed near the surface of the part. The various parts, therefore, do not always come back to the same dimensions that they had before brazing. The dimensional change of the various parts when going through the brazing cycle will be partly a function of the mass of the part, the heaviness of coating of the brazing alloy and possibly a function of some internal stresses that may have originally been built up in the part during the forming operation. As a result, there will be a tendency for the parts to move or to become misaligned during the brazing operation.

It is therefore the primary object of this invention to provide an improved plate and ruffled fin heat exchanger wherein any misalignment of the parts during the brazing cycle is prevented.

It is a further object of this invention to provide an improved plate and ruffled fin-type heat exchanger which allows for differences in the expansion rate of the parts making up the heat exchange structure.

Other objects of the invention will be pointed out in the following description and claims and illustrated in the accompanying drawings, which disclose, by way of example, the principles of the invention and the best mode which has been contemplated of applying these principles.

In the drawings:

FIGURE 1 is a front elevational view of a brazed plate and ruffled fin heat exchanger employing one form of this invention;

FIGURE 2 is a top view, partially in section and partially broken away, of the heat exchanger shown in FIGURE 1;

FIGURE 3 is a partial side elevational view of the heat exchanger shown in FIGURES 1 and 2;

Figure 4:
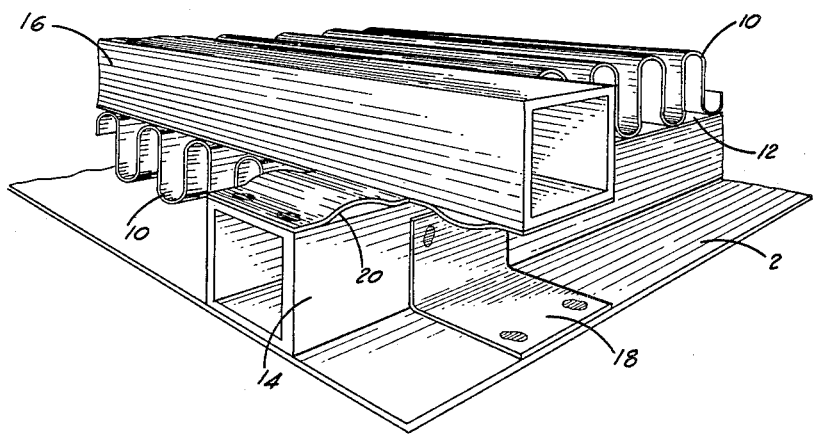
FIGURE 4 is a perspective view of a portion of the heat exchanger shown in FIGURES 1 to 3.

In general, the invention is directed to a plate and ruffled fin heat exchanger and to an improved method for preventing misalignment of the parts forming the heat exchanger during the brazing operation. The method is employed with a heat exchanger including a number of pairs of crossed spacer bars which are separated by a conventional separator plate. Positioned between the separator plates and the crossed pairs of spacer bars are a plurality of ruffled fin elements, which are at right angles to each other. The spacer bars extend beyond the ends of the adjoining ruffled fin elements, and the separator plates include tab portions extending therefrom at all points where the spacer bars contact the plates. The tips of the tabs are spot welded to the spacer bars at the outer ends thereof so as to allow free movement of the separator plates and the spacer bars relative to each other in a direction perpendicular to the plane of the plates, while preventing any lateral movement between the adjoining elements. Any difference in expansion between the separator sheet and the bars will take place in the tab outside of the heat exchanger proper where such expansion loop causes no difficulty.

Referring now to the drawings, there is shown in FIGURE 1 a spaced plate and ruffled fin heat exchanger of the conventional "sandwich" type construction which includes a series of stacked ruffled fin elements 10 which are separated by conventional separator plates or sheets 12. Along the outer extremities of the ruffled fin elements, there are provided a number of hollow spacer bars 14 and 16 adjacent each section of ruffled fin elements 10. The spacer bars 14 are at right angles to spacer bars 16 and are separated therefrom by the separator plates 12 which separate the ruffled fin elements. Since the ruffled fin elements are relatively weak, the spacer bars are provided to insure proper spacing of the separator plates as well as to prevent crushing of the lower fin elements by the weight of the upper structure. While the present invention may be employed with metal heat exchange structures whose parts are constructed of various metals, it is especially applicable to units constructed of relatively light metals having good heat conductivity as aluminum or the like.

As indicated in FIGURE 2, the ruffled fin elements 10 are also positioned at right angles to each other to provide a heat exchanger having the desired characteristics needed for the specific application required. There is further provided a number of L-shaped supports 18 which are attached to the upper and lower separator plates 12 at the outside of the spacer bars 14 as indicated in FIGURE 1, the L-shaped supports 18 being secured to the separator plates 12 and to the spacer bars 14 by any conventional means, such as spot welding, FIG. 4, prior to the brazing cycle.

The present invention is directed to a means for preventing relative displacement of the parts forming the heat exchanger proper during the brazing cycle. For this reason the separator plates 12, with the exception of the bottom and top plates, are provided with extension tabs 20 and 22 extending from the outer extremity of the separator plate 12 at the points where the respective spacer bars contact the plates. The tabs 20 and 22 extend outwardly to the outer edge of the spacer bars 14 and 16 and are secured to the edge of the bars by spot welding or the like prior to brazing the complete unit. As indicated best in FIGURE 4, one of the extension tabs 20 corresponding to spacer bar 14, is spot welded to the top of the underlying spacer bar 14 while the other extension tab 22 of the same separator plate 12 is spot welded to the bottom of the corresponding overlying spacer bar 16. In this manner, the extension tab 20 which is rigidly secured to the outer end of the lower spacer bar 14 will take up any expansion of the separator plate 12 with respect to the bar along the axis of the lower spacer bar 14, while the extension tab 22 which is rigidly secured to the overlying bar 16 will take up any expansion of the separator plate 12 along the axis of the upper spacer bar 16. At the same time, by spot welding both extension tabs 20 and 22 to their respective spacer bars 14 and 16 at all four sides of the structure, any lateral shifting of the separating plate with respect to the spacer bars within the heat exchanger proper will be prevented. As such, any relative difference in expansion and contraction between the spacer bar and the separator plates will be taken up by the extension tabs and a "bellows" effect will be produced within the tabs giving them a bowed appearance, as best indicated in FIG. 4.

Figure 5:
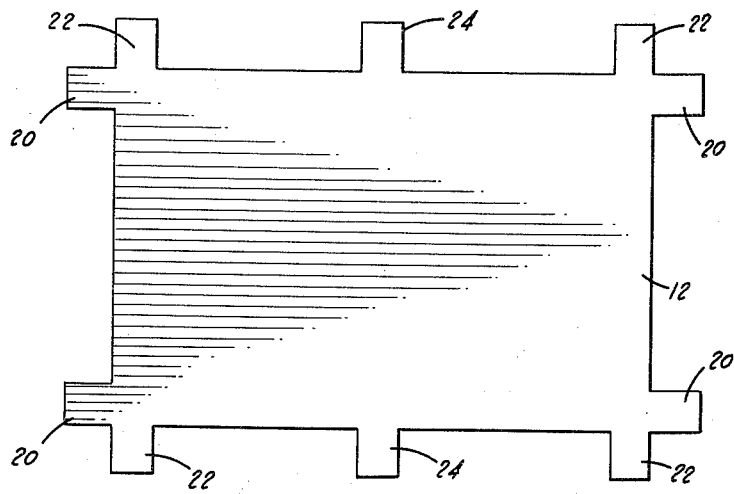
FIGURE 5 is a plan view of a separator plate forming a portion of the heat exchanger shown in FIGURES 1 through 4.

As shown in FIGURES 2 and 3, there is also provided a spacer bar 14' which extends laterally throughout the heat exchange unit intermediate of either end and this spacer bar is also coupled to its adjoining separator sheet or plate by means of tab extensions 24 which are shown in FIGURE 5. The extension tabs 24 are also spot welded to the ends of the spacer bars 14' outside of the heat exchange unit proper which will allow the tabs to take up longitudinal expansion, but prevent any lateral movement between the spacer bars 14' and the adjoining separator plates 12.

While in some heat exchange structures it is unnecessary to include spacer bars during the brazing operation, since all that is required to form the heat exchanger is a series of stacked ruffled fin sections and separating plates, the present invention is directed to a heat exchange structure of the type in which spacer bars become a part of the final heat exchanger assembly and are not removed after the brazing operation. As such, the spacer bars act to keep a predetermined space or distance between the separator sheets, thereby preventing any variation in individual section thickness such as that which normally would be caused by the weight of the upper sections pressing down upon the lower sections. In addition, the use of spacer bars makes possible a more rigid and far more sturdier heat exchange structure which will take greater punishment before any possible distortion of the parts. Thus, the present invention is adapted to be used in any conventional type plate and ruffled heat exchanger which makes use of spacer bars for insuring proper spacing of the stacked ruffled fin sections, the only requirement being the need for spacer bars which extend longitudinally past the extreme edges of the ruffled fin sections. In the preferred embodiment, the tabs are of such a length that they terminate at the end of their associated spacer bar; however, they may be shorter, so long as they extend sufficiently past the heat exchanger proper to allow a rigid securement to the spacer bars while allowing sufficient area to take up the difference in expansion of the separator plates and the spacer bars. Thus, the present invention may be used with any heat exchanger having more than two ruffled fin sections forming the stacked heat exchange structure. While the preferred embodiment shows a separator plate having extension tabs at the points where the spacer bars cross and contact the separator plate, it is not necessary that the extension tabs be placed at each and every crossing. Nor is it necessary that the extension tabs be of a width identical to that of the spacer bars, as the only requirement is to provide a somewhat smaller section of the separator plate which has its end or tip portion securely fastened to the edge of the spacer bar outside of the heat exchange proper so that the tab portion may take up any relative expansion between the separator plate and the spacer bar.

In the preferred embodiment, the separator plates include a coating of brazing alloy, such that upon insertion in a heated brazing furnace, the alloy will melt and fuse the parts of the heat exchanger together. However, the present technique is applicable to heat exchange brazing methods wherein the brazing alloy may be appropriately introduced at the same time that the heat exchange unit is assembled wherein the brazing alloy may be in strip form and appropriately laid over the separator plates.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A plate and ruffled fin heat exchanger comprising; at least two stacked ruffled fin elements, a thin separator plate separating the stacked ruffled fin elements and sandwiched therebetween, spacer bars positioned longitudinally and at opposite edges of each of said ruffled fin elements, said spacer bars associated with one of said ruffled fin elements being transverse to spacer bars associated with said other ruffled fin element, said spacer bars including portions extending beyond the edges of said ruffled fin elements, extension tabs on said separator plate at the positions where said spacer bars contact said separator plate, said extension tabs also extending beyond the edges of said ruffled fin elements, means for securing some of said extension tabs at the outer end thereof to the underlying spacer bars, and the others of said extension tabs at their outer ends to the overlying spacer bars such that said relatively narrow tabs will take up any expansion differences between said separator plates and said spacer bars during said brazing operation.

2. A heat exchanger as claimed in claim 1 wherein said tab extensions are of a width equal to the width of the spacer bars and of a length such that they terminate at the outer edge of said extension portions of said spacer bars.

3. A heat exchanger as claimed in claim 1 whereby said spacer bars adjacent one ruffled fin section are at right angles to the spacer bars of the next adjacent ruffled fin section.

4. A heat exchange structure as claimed in claim 1 further including a layer of brazing alloy on either side of said separator plate.

5. A plate and ruffled fin heat exchanger comprising at least two stacked ruffled fin elements, a thin separator plate sandwiched between the fin elements and extending at least to the edges thereof, spacer bars positioned adjacent each fin element and abutting the separator plate, and portions on the separator plate secured to the spacer bars, said portions being more flexible in the assembled position than the remainder of the separator plate, so that any difference of expansion between the separator plate and spacer bars during a subsequent brazing operation will be taken up by the flexure of said portions.

6. A plate and ruffled fin heat exchanger comprising at least two stacked ruffled fin elements, a separator member sandwiched between and separating the fin elements, a spacer member positioned adjacent each fin element and abutting the separator member, and tabs secured to one of the members and coupled to the other of the members to hold said members in place, said tabs being flexible in the assembled position compared to the members so that any difference of expansion between the separator member and spacer members during a subsequent brazing operation will be taken up by the flexure of the flexible tabs.

7. A plate and ruffled fin heat exchanger, comprising at least two stacked ruffled fin elements, a thin separator plate sandwiched between the fin elements and extending at least to the edges thereof, spacer bars positioned adjacent each fin element and abutting the separator plate, and a plurality of spaced narrow tabs projecting from the separator plate each secured at its free end to only one of the spacer bars, said tabs being more flexible than the remainder of the separator plate, so that any difference of expansion between the separator plate and spacer bars during a subsequent brazing operation will be taken up by the flexure of said tabs.

8. A plate and ruffled fin heat exchanger, comprising at least two stacked ruffled fin elements, a separator member sandwiched between and separating the fin elements, a spacer member positioned adjacent each fin element and abutting the separator member, and a plurality of narrow tabs each coupled at its opposite ends to the members to hold said members in place, said tabs each being flexible along its length compared to the members, so that any difference of expansion between the members during a subsequent brazing operation will be taken up by flexure along the length of the tabs.

References Cited in the file of this patent

UNITED STATES PATENTS

| | | |
|---|---|---|
| 2,172,819 | Howard et al. | Sept. 12, 1939 |
| 2,368,814 | Fagan | Feb. 6, 1945 |
| 2,396,522 | Modine | Mar. 12, 1946 |
| 2,566,310 | Burns et al. | Sept. 4, 1951 |
| 2,784,947 | Peterson | Mar. 12, 1957 |
| 2,899,177 | Harris et al. | Aug. 11, 1959 |
| 2,961,222 | Butt | Nov. 22, 1960 |

FOREIGN PATENTS

| | | |
|---|---|---|
| 1,125,663 | France | Nov. 5, 1956 |